US012366825B2

(12) United States Patent
Philippon et al.

(10) Patent No.: US 12,366,825 B2
(45) Date of Patent: Jul. 22, 2025

(54) TIMEPIECE CASE COMPRISING A CORRECTION MEMBER

(71) Applicant: ETA SA Manufacture Horlogere Suisse, Grenchen (CH)

(72) Inventors: David Philippon, St-Imier (CH); Roman Egli, Neuendorf (CH); Raphaël Courvoisier, Corcelles (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 392 days.

(21) Appl. No.: 18/077,726

(22) Filed: Dec. 8, 2022

(65) Prior Publication Data

US 2023/0195033 A1 Jun. 22, 2023

(30) Foreign Application Priority Data

Dec. 16, 2021 (EP) .................................... 21215205

(51) Int. Cl.
*G04B 3/04* (2006.01)
*G04B 27/00* (2006.01)
*G04B 37/00* (2006.01)

(52) U.S. Cl.
CPC ............. *G04B 3/046* (2013.01); *G04B 3/041* (2013.01); *G04B 27/004* (2013.01); *G04B 37/0033* (2013.01)

(58) Field of Classification Search
CPC ...... G04B 3/046; G04B 3/041; G04B 27/004; G04B 37/0033; G04B 37/06; G04B 3/048; G04B 27/00; G04B 37/00; G04B 3/04; G04B 18/02; G04B 19/00; G04B 19/25; G04B 27/02; G04B 27/08; G04B 37/0008; G04B 37/0091; G04B 37/0427; G04B 37/08; G04B 37/04; G04C 3/001
See application file for complete search history.

(56) References Cited

U.S. PATENT DOCUMENTS

| | | | | |
|---|---|---|---|---|
| 3,977,178 | A | 8/1976 | Wenger | |
| 7,441,945 | B2 * | 10/2008 | Laucella | G04B 3/048 368/190 |
| 7,625,116 | B2 * | 12/2009 | Bron | G04B 19/02 368/106 |

FOREIGN PATENT DOCUMENTS

| | | | |
|---|---|---|---|
| CH | 11 320/74 | A4 | 5/1976 |
| CH | 706 232 | A2 | 9/2013 |
| CH | 706 888 | A2 | 3/2014 |
| EP | 1 939 699 | A1 | 7/2008 |

OTHER PUBLICATIONS

European Search Report for EP 21 21 5205, dated Jun. 2, 2022.

* cited by examiner

*Primary Examiner* — Edwin A. Leon
(74) *Attorney, Agent, or Firm* — Sughrue Mion, PLLC

(57) ABSTRACT

A timepiece case including a middle (20) receiving a horological movement (1) having at least one function corrector (10, 12) for carrying out various functions of activating, selecting, resetting and/or correcting a piece of information derived from the current time of the horological movement (1). The middle has a correction member (100), and a control stem (120) moving in translation within the cylindrical body of the correction member. The correction member (100) is mounted such that it slides in the middle (20) between a plurality of stable positions, each of the stable positions modifying the position of the end (122) of the control stem (120) facing the horological movement (1).

21 Claims, 3 Drawing Sheets

TIMEPIECE CASE COMPRISING A CORRECTION MEMBER

CROSS REFERENCE TO RELATED APPLICATIONS

This application claims priority to European Patent Application No. 21215205.2 filed Dec. 16, 2021, the entire contents of which are incorporated herein by reference.

TECHNICAL FIELD OF THE INVENTION

The invention relates to a timepiece case, for example a wristwatch case, comprising a multifunction correction member allowing, for example, information displayed on a dial to be selected and/or modified by means of a single control member.

The invention further relates to a timepiece comprising such a case and such a multifunction correction member for selecting and/or modifying information displayed on a dial, for example to correct, engage or reset several functions derived from the current time.

TECHNOLOGICAL BACKGROUND

A timepiece, in particular a wristwatch, allows the user to know the current time. This current time can be corrected by exerting an action (for example by pulling) on the winding stem until a certain position for this corrective action is reached.

The wristwatch can also be used to display, correct, engage and reset functions derived from the current time, generally referred to as complications, such as a date, time zone or chronograph, etc.

For this purpose, correction members must be incorporated into the middle of the case of the wristwatch to control and/or correct these ancillary functions.

These correction members typically comprise a control member of the push-piece type positioned outside the middle of the watch case and which cooperates with a control stem capable of moving inside an orifice radially passing through the middle. Such correction members allow the ancillary functions to be controlled and/or corrected without the user being required to use a tool.

Some timepieces, and in particular watches, comprising a plurality of complications, offer their users a high number of functions that require multiplying the number of these correction members on the case.

However, the multiplication of the number of correction members in the middle poses layout problems and can lead to aesthetic problems, in particular for mid-range and top-range timepieces, where a sober and elegant appearance is sought.

The multiplication of the number of correction members in the middle also creates sealing problems due to the multiplication of the number of openings that must be made in the watch case in order to integrate and mount the various correction members.

SUMMARY OF THE INVENTION

In this context, the invention aims to propose a solution to the previously mentioned drawbacks of the prior art, by proposing in particular a timepiece case comprising a correction member allowing at least two different functions to be selected, activated and/or modified, using the same correction member requiring a single opening in the case middle to be mounted.

For this purpose, the invention relates to a timepiece case comprising a middle delimiting an internal space capable of receiving a horological movement having at least one function corrector for carrying out various functions of activating, selecting, resetting and/or correcting a piece of information derived from the current time of said horological movement, the middle having a through-aperture configured to receive a correction member capable of interacting with at least one function corrector of said horological movement, said correction member comprising: a cylindrical body with a longitudinal axis X-X, a control stem capable of moving in translation within said cylindrical body, along the longitudinal axis X-X, said control stem comprising an end intended to cooperate with at least one function corrector of said horological movement, a push-piece integral with said control stem and accessible to the user from outside said case, characterised in that the correction member is mounted such that it slides within said aperture in the middle between a plurality of stable positions, each of the stable positions modifying the position of the end of said control stem facing said horological movement.

Thus, the user can easily select at least one function corrector of said horological movement that he/she wishes to activate, and adjust it when the push-piece is pressed.

Thus, the case and the correction member according to the invention propose an innovative solution for minimising the number of openings to be made in the middle of the watch case. Thus, the problems concerning sealing and layout are avoided by reducing the number of corrector devices to be implanted in the middle.

It should be noted that the multifunction correction member according to the invention is a correction device that is different from a setting crown connected to the winding stem which procures a time setting function, and optionally allows the barrel to be wound. Thus, the multifunction correction member according to the invention is not connected to a winding stem, for winding a barrel, and does not allow the current time of the movement to be set.

In addition to the features mentioned in the preceding paragraph, the timepiece case according to the invention can have one or more complementary features from among the following, considered either on an individual basis or according to any combination technically possible:

- for one of the stable positions of the correction member, the end of said control stem is capable of being positioned facing a function corrector of the horological movement, such that the correction member is capable of carrying out a function associated with the function corrector when the push-piece is pressed;
- for one of the stable positions of the correction member, the end of said control stem is capable of being positioned facing a plurality of function correctors of the horological movement, such that the correction member is capable of simultaneously carrying out a combination of functions associated with the function correctors when the push-piece is pressed;
- for one of the stable positions of the correction member, the end of said control stem is configured such that it is inactive with respect to the horological movement when the push-piece is pressed;
- the horological movement comprises a first function corrector and a second function corrector, and in a first stable position of the correction member, the end of said control stem is capable of being positioned such that it faces the first function corrector, and in a second stable position of the correction member, said end of said control stem is capable of being positioned such that it faces the second function corrector;

the aperture is configured to allow the correction member to be mounted within the middle such that it slides in a rectilinear manner;

the aperture is configured to allow the correction member to be mounted within the middle such that it slides in a curvilinear manner;

the cylindrical body cooperates with a mounting ring capable of moving in the aperture and configured to secure the correction member to said middle;

the aperture forms a slide and in that the mounting ring forms a slider capable of moving in the aperture;

the aperture is oblong in shape and in that the mounting ring has a complementary shape so as to slide in said aperture;

said mounting ring comprises a flange configured to cooperate with a spot face provided at an inner face comprised in the middle;

said cylindrical body is made integral with the mounting ring by screwing or driving in;

the cylindrical body has the shape of a cylinder of revolution with an axis of revolution X-X and in that the control stem is coaxial with the cylindrical body;

the correction member comprises a return element configured to ensure the return of the push-piece to a stable rest position;

the case comprises an indexing member for indexing the plurality of stable positions of the correction member;

the indexing member is formed by a plurality of ball indexers carried by the middle;

the indexing member is formed by a plurality of ball indexers provided in bores comprised in the middle;

the ball indexers cooperate with hollows provided on the mounting ring.

The invention further relates to a timepiece comprising a case according to the invention, a horological movement housed inside said case, the horological movement carrying and driving means for displaying the current time and comprising at least one function corrector, in particular allowing at least one piece of information derived from the current time of said horological movement to be activated, selected, reset or corrected.

Advantageously, the horological movement comprises a first function corrector and a second function corrector.

Advantageously, the first function corrector and the second function corrector are formed by superimposed pivoting levers.

Advantageously, the timepiece is a wristwatch.

Advantageously, the movement of the timepiece is a mechanical movement.

BRIEF DESCRIPTION OF THE FIGURES

The purposes, advantages and features of the present invention will be better understood upon reading the detailed description given below with reference to the following figures.

In all figures, common elements bear the same reference numerals unless indicated otherwise.

DETAILED DESCRIPTION OF THE INVENTION

The correction member according to the invention is a multifunction correction member that allows function correctors comprised in a horological movement to be selected and/or activated in order to carry out various functions of activating, selecting, resetting and/or correcting information derived from the current time, by means of a single control member accessible to the user from outside the case.

The correction member thus forms a user interface for controlling various functions associated with information derived from the current time comprised in a horological movement fitted inside a case.

Figure 1:
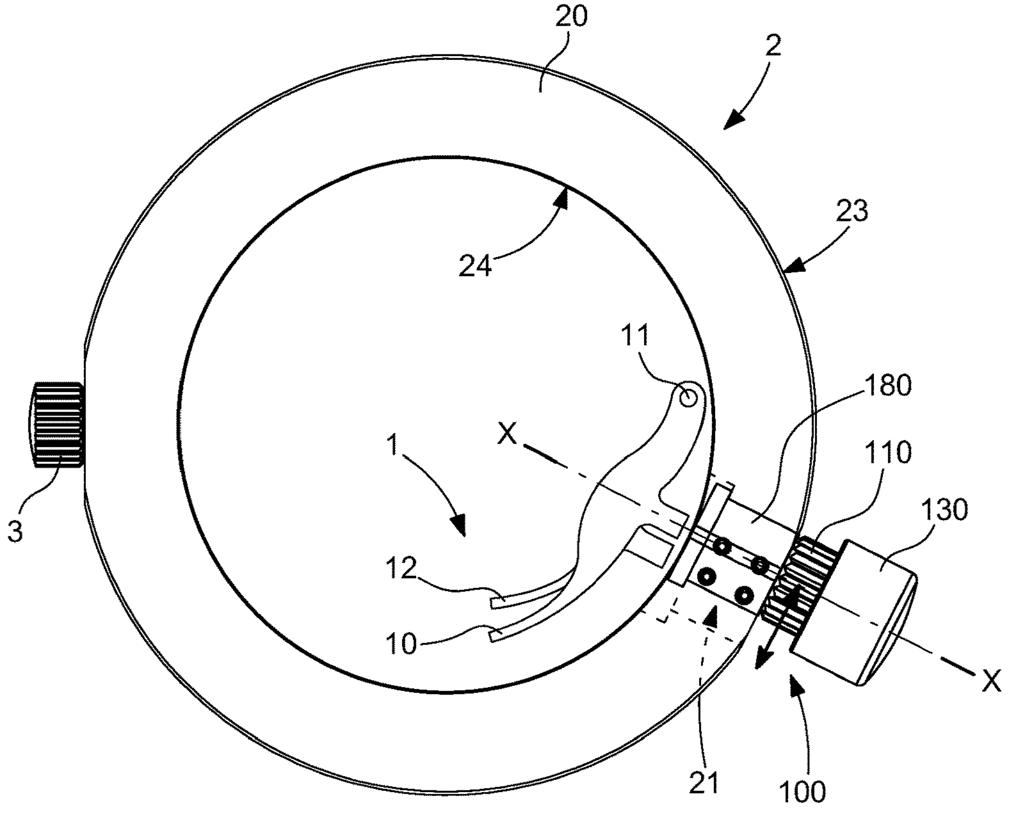
FIG. 1 diagrammatically shows a top view of an example embodiment of a timepiece case comprising a correction member according to the invention.

FIG. 1 diagrammatically shows a top view of an example embodiment of a timepiece case 2 comprising a correction member 100 according to the invention.

With reference to FIG. 1, the middle 20 is shown transparently so that the correction member 100 can be viewed as a whole.

The correction member 100 extends along a longitudinal axis X-X.

As shown in FIG. 1, the correction member 100 according to the invention is a correction member that is different from a setting crown 3 connected to the winding stem (not shown) which procures a current time setting function, and optionally allows the barrel to be wound. In other words, the correction member 100 according to the invention is not connected to a winding stem and does not allow the current time of the movement to be set.

The timepiece case 2 is, for example, a wristwatch case.

The case 2 conventionally comprises a back (not shown), a side wall forming a middle 20 and a glass (not shown) closing the case.

The case 2 shown is circular in shape, however the invention is also applicable to other case shapes typically used in the horology field.

The middle 20 has an outer face 23 and an inner face 24. The inner face 24 of the middle 24 delimits an internal space intended to receive a horological movement 1 (not shown in its entirety).

The horological movement 1 carries and drives means for displaying the current time and comprises in particular at least one complication for displaying at least one piece of information derived from the current time. To this end, the horological movement 1 comprises a plurality of function correctors 10, 12 allowing at least one piece of information derived from the current time to be displayed, corrected, selected, engaged and/or reset.

In the example embodiment shown, the horological movement 1 comprises a first function corrector 10 and a second function corrector 12 allowing at least one function derived from the current time to be displayed, corrected, selected, engaged or reset. However, this representation is not limiting in nature.

For example, the horological movement 1 can comprise a complication such as a date, time zone, or chronograph, etc.

The function correctors 10, 12 are, for example, superimposed levers mounted such that they pivot about a pivot pin 11, as shown in particular in FIG. 1. However, other types of function correctors can be considered.

Figure 2:
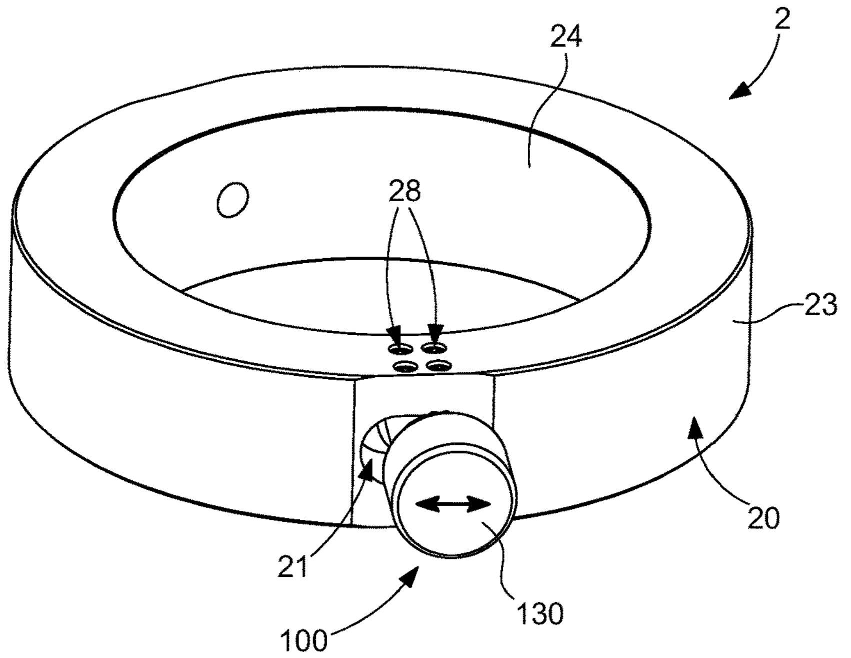
FIG. 2 shows a view of the outer face of the middle where the correction member according to the invention is installed.

FIG. 2 shows a view of the outer face 23 of the middle 20, in particular where the correction member 100 is installed.

Figure 6:
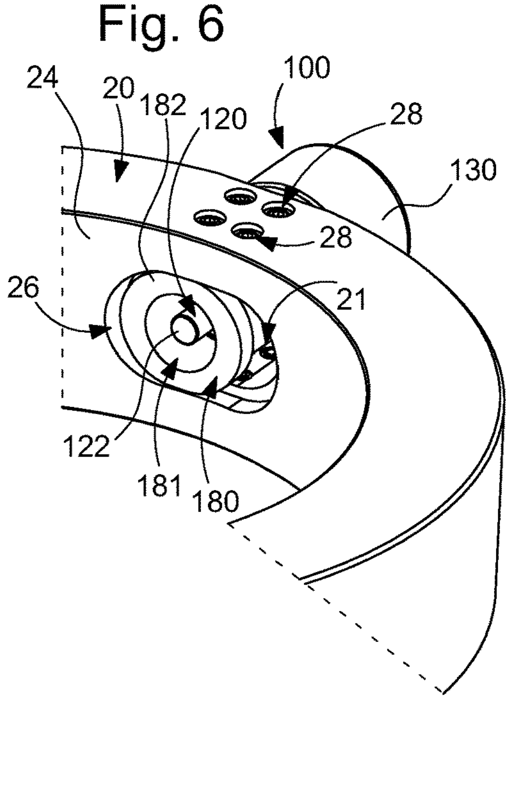
FIG. 6 shows a view of the inner face of the middle where the correction member according to the invention is installed.

FIG. 6 shows a view of the inner face 24 of the middle 20, in particular where the correction member 100 is installed.

As shown in particular in FIGS. 1, 2 and 6, the middle 20 has a through-aperture 21 having a radial orientation, i.e. extending from the outer face 23 to the inner face 24, and configured to receive and carry the correction member 100 according to the invention.

The aperture 21 forms a slide and is configured to allow the correction member 100 to be slidably mounted, such that it can move inside the middle 20.

The aperture 21 allows the correction member 100 to move back and forth in the middle 20, thus allowing the positioning of the correction member 100 in the middle 20 and opposite the horological movement 1, to be displaced and modified. It is thus possible to position the correction member 100 in various stable activation positions allowing the correction member to be positioned such that it faces one or more function correctors comprised in the horological movement 1, or in a neutral position allowing the correction member to be positioned such that it does not face any function corrector comprised in the horological movement 1, to ensure that no function of the movement will be inadvertently activated in the event the correction member 100 is pressed.

The aperture 21 can have various shapes depending on the number of positions of the correction member 100 that are desired, the integration needs of the various parts, and the shape of the case 2, etc.

Of course, it is clear that the back-and-forth movement allowed by the aperture 21 is different from the displacement inherent to the operation of the correction member 100, the push-piece whereof is displaced radially relative to the middle 20, i.e. along the longitudinal axis X-X of the cylindrical body 110.

For example, the aperture 21 is oblong in shape. However, other shapes are possible as long as the aperture 21 forms a slide and allows the correction member 100 to be mounted such that it slides and allows the relative position of the correction member 100 to be modified relative to the horological movement by sliding inside the middle 20.

At the inner face 24, the aperture 21 has an oblong spot face 26 (visible in particular in FIG. 6).

Figure 3:
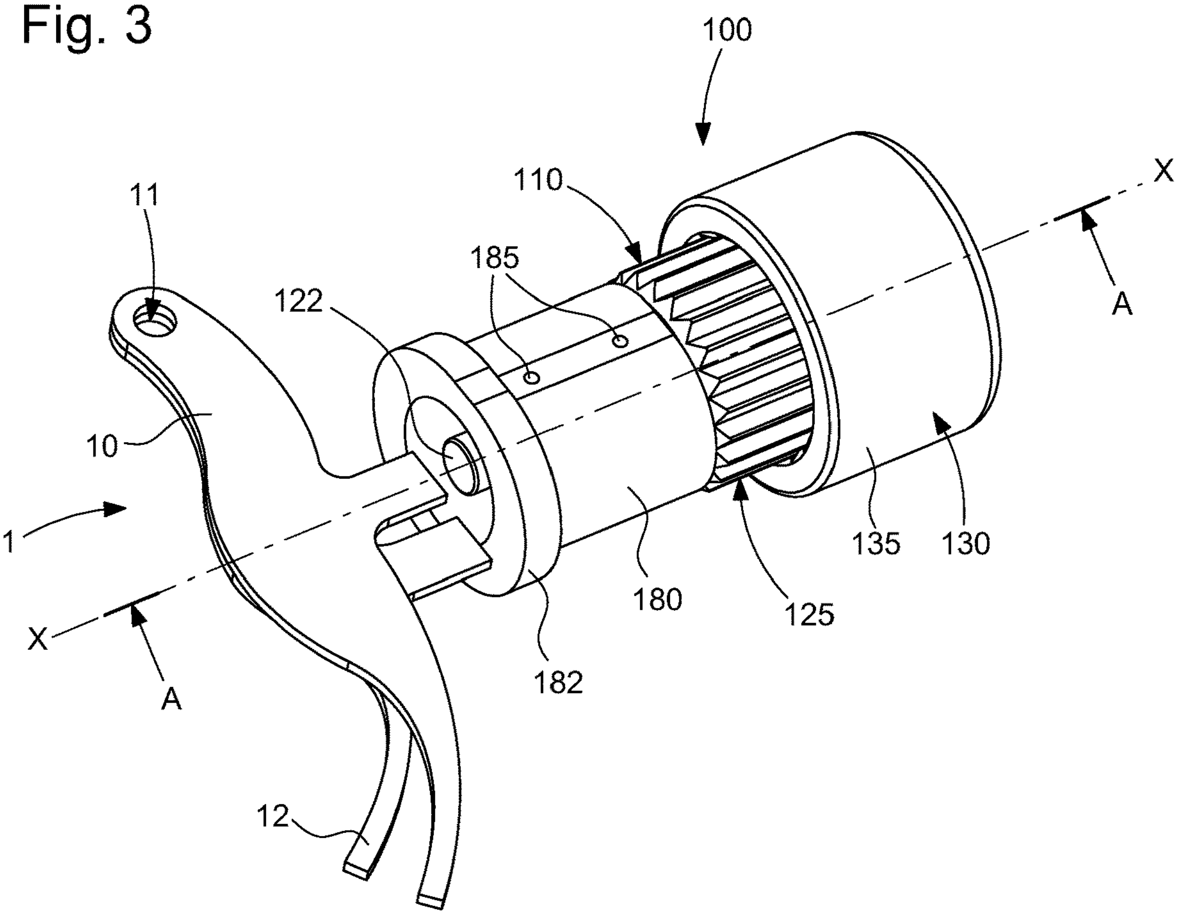
FIG. 3 is a more detailed view of the correction member according to the invention.
Figure 4:
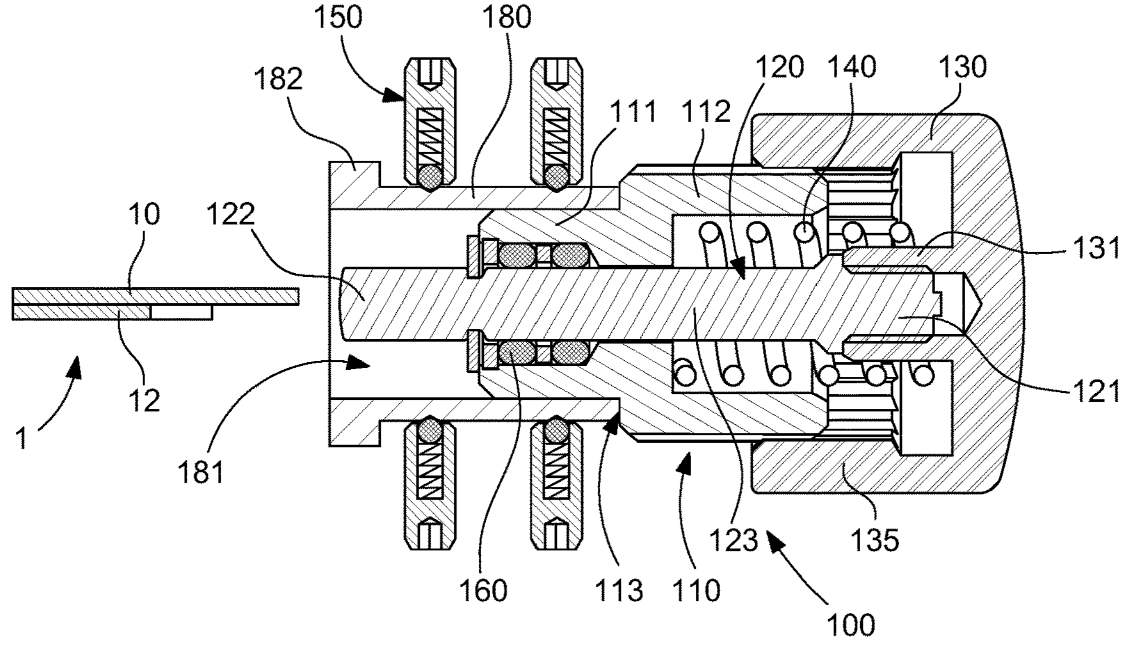
FIG. 4 is a sagittal sectional view, along the axis A-A illustrated in FIG. 3, of the correction member according to the invention.

FIG. 3 is a more detailed representation of the correction member 100 according to the invention, and FIG. 4 is a sagittal sectional view, along the axis A-A shown in FIG. 3. It should be noted that in FIG. 3, the middle 20 is not shown in order to better visualise the correction member 100 and the interaction thereof with the function correctors 10, 12 of the horological movement 1.

The correction member 100 according to the invention is of the push button type.

The correction member 100 comprises a cylindrical body 110 cooperating with a movable mounting ring 180 forming a slider capable of sliding in the aperture 21. The two elements together allow the correction member 100 to be secured to the middle 20 and allow the correction member 100 to be mounted such that it slides at the aperture 21 of the middle 20.

In the example embodiment shown, the cylindrical body 110 is a cylinder of revolution with an axis of revolution X-X having a circular section.

The cylindrical body 110 comprises a tubular part 111 and a head 112, the head 112 forming a first end of the cylindrical body 110.

The tubular part 111 can have a threaded portion for the assembly thereof by screwing to the mounting ring 180. The mounting ring 180 comprises a flange 182 intended to come to bear at the spot face 26 of the aperture 21 of the middle 20.

For this purpose, the outer shape of the mounting ring 180 is configured such that it can slide freely back and forth laterally in the aperture 21 between at least two positions.

In the example embodiment shown, the mounting ring 180 is cylindrical in shape with an oblong section having an internal circular bore 181. The internal circular bore 181 has a threaded portion to receive the tubular part 111 of the cylindrical body 110 and to allow the two elements to be assembled by screwing, as well as to allow the correction member 100 to be mounted with the middle 20.

According to an alternative embodiment, the tubular part 111 of the body 110 can be driven into the internal circular bore 181 of the mounting ring 180.

The end flange 182, which bears against the spot face 26 of the aperture 21, forms a positioning stop and ensures the mounting of the correction member 100 when the cylindrical body 110 is screwed or driven in from the outside of the middle 20.

The head 112 of the cylindrical body 110 is the part of the cylindrical body 110 that remains outside the middle 20, i.e. on the side opposite the movement 1, the tubular part 111 and the mounting ring 180 cooperating at the aperture 21 in the middle 20.

The cylindrical body 110 comprises a shoulder 113 provided between the head 112 and the tubular part 111. The shoulder 113 forms a circular bearing or stop surface intended to receive the end of the mounting ring 180 opposite the end flange 182.

The shoulder 113 further allows a mounting stop to be formed with the outer face 23 of the middle 20.

The correction member 100 further comprises a cylindrical control stem 120, with a longitudinal axis X-X. By way of example, the control stem 120 is a circular cylindrical stem, with an axis of revolution X-X.

The control stem 120 is configured to slide within the cylindrical body 110 along the axis X-X; and more particularly in an internal bore through the cylindrical body 110 provided to receive the control stem 120.

The control stem 120 is coaxial with the cylindrical body 110.

The control stem 120 is integral with a push-piece 130 that can be operated by the user from outside the case 2.

The control stem 120 comprises:

- a first end 121 facing the exterior of the case 2 and made integral with the push-piece 130, for example by driving in or screwing;
- a second end 122 facing the interior of the case 2 and intended to come into contact with a function corrector 10, 12 of the horological movement 1 and to actuate same when the user presses on the push-piece 130;

a central portion 123 forming the junction between the first end 121 and the second end 122.

With reference to FIG. 4, the first end 121 of the control stem 120 has a threading made on a radially external face for screwing in the push-piece 130.

The end 122 of the control stem 120 is intended to be positioned facing the horological movement 1, and more particularly a function corrector 10, 12, a plurality of function correctors 10, 12 or even not facing any function corrector depending on the position of the correction member 100 in the middle 20.

The push-piece 130 has an overall capsule shape configured to slide concentrically outside the cylindrical body 110, and more particularly the head 112. The push-piece 130 comprises an internal hollowing in which a shaft 131 is provided, having a tapped bore at the centre thereof to receive the first end 121 of the control stem 120.

In a conventional manner, the correction member 100 can further comprise blocking means for blocking the rotation of the push-piece 130 relative to the cylindrical body 110 about the axis of revolution X-X.

By way of example, the blocking means can be formed by the cooperation of protruding elements 125, for example flutes, provided on the radially outer face (with respect to the axis X-X) of the periphery of the head 112 of the cylindrical body 110 and by hollowings, of complementary shape, for example grooves, provided at the radially inner face (with respect to the axis X-X) of the peripheral wall 135 delimiting the internal hollowing of the push-piece 130. It goes without saying that a different disposition of the protruding elements and hollowings is also possible without going beyond the scope of the invention.

The blocking means thus allow the rotation of the push-piece 130 to be blocked relative to the cylindrical body 110.

According to an alternative embodiment (not shown), the rotation of the push-piece 130 relative to the cylindrical body 110 is left free, such that the push-piece 130 is free to pivot about the axis X-X.

The return to a rest position of the correction member 100 is ensured by a return element 140, for example a return spring, positioned between the cylindrical body 110 and the push-piece 130. Thus, the return element 140 tends to reposition the push-piece 130 and the control stem 120 to a rest position when the user is not pressing on the push-piece 130.

To this end, the cylindrical body 110 comprises an end cavity formed at the head 112 and configured to receive a first end of the return member 140 such that it bears thereagainst. The second end of the return member 140 comes to bear against the internal hollowing of the push-piece 130.

The case 2 according to the invention comprises an indexing member 150 for defining stable positions of the correction member 100 capable of moving in the middle 20. The indexing member 150 allows, for example, at least two stable positions of the correction member to be defined.

Advantageously, the indexing member 150 indicates to the user, for example in a sensitive manner, that the correction member 100 is correctly positioned, thus avoiding any positioning between two positions for activating the correction member 100. Thus, such an indexing member 150 ensures that the end 122 of the control stem 120 is correctly positioned relative to the horological movement in order to perform the desired function, for example to operate the first function corrector 10 and/or to operate the second function corrector 12 of the horological movement 1, or even to position the correction member 100 in a neutral, or inactive, position, making it possible to not interact with the horological movement.

The indexing member 150 further procures a stable position of the correction member 100 when the user presses the push-piece 130.

By way of example, the indexing member 150 is formed by a plurality of spring-loaded ball indexers carried by the middle 20. More particularly, the spring-loaded ball indexers are housed in bores 28 provided for this purpose in the middle 20. The indexers are configured to mark a plurality of stable positions of the movable correction member 100 in the aperture 21.

The spring-loaded ball indexers are configured to cooperate with hollows 185 provided on the mounting ring 180, for example on the radially outer surface of the periphery of the mounting ring 180 as shown in FIG. 3.

In the example embodiment described, the middle 20 comprises eight spring-loaded ball indexers, four spring-loaded ball indexers for each stable position.

Figure 5A:
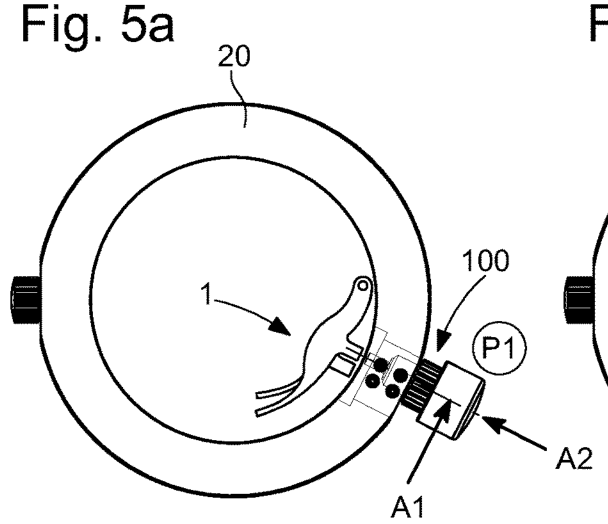
FIGS. 5*a* and 5*b* show two positioning states of the correction member according to the invention, allowing two different function correctors inside the case to be activated.
Figure 5B:
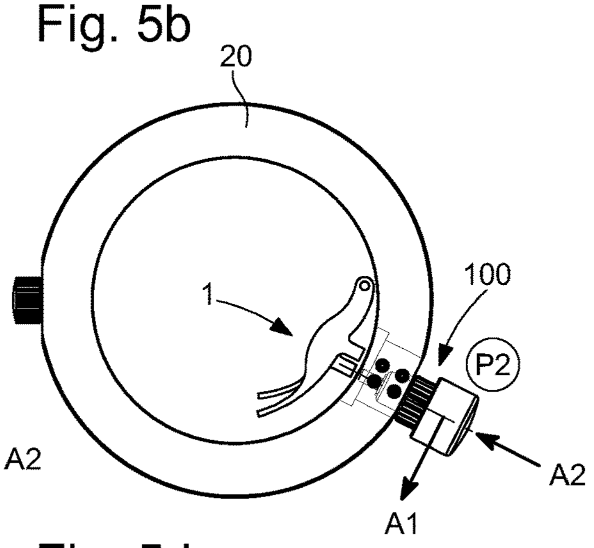

In the example embodiment described, the indexing member 150 has been described to define two stable positions of the correction member corresponding to two activation positions P1, P2 for activating the correction member 100, i.e. a first stable activation position P1 for activating the first function corrector 10, as shown in FIG. 5*a*, and a second stable activation position P2 for activating the second function corrector 12, as shown in FIG. 5*b*.

FIGS. 5*a* and 5*b* show the correction member 100 in a first activation position and in a second activation position respectively.

However, the aperture 21 can be sized and the indexing member 150 can be configured so as to define a plurality of stable positions of the correction member 100.

Figure 5C:
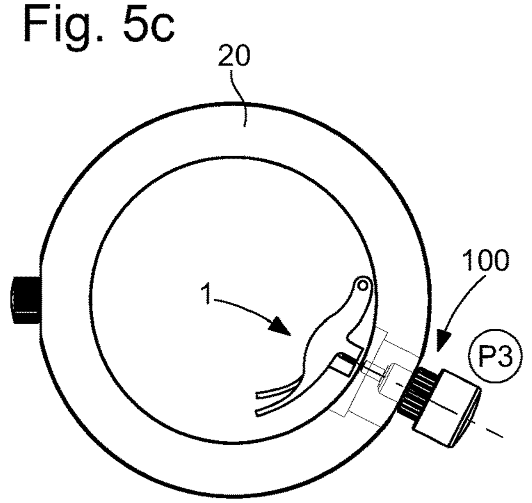
FIG. 5*c* shows a positioning state of the correction member allowing a plurality of function correctors of the horological movement to be activated simultaneously.

For example, one of the stable positions P3 of the correction member 100, illustrated in FIG. 5*c*, allows at least two function correctors 10, 12 to be operated simultaneously when the user presses the push-piece 130.

Figure 5D:
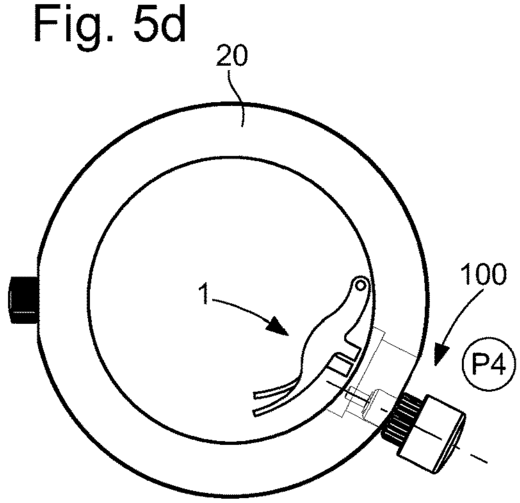
FIG. 5*d* shows a positioning state of the correction member preventing any action on the function correctors of the horological movement.

For example, one of the stable positions P4 of the correction member 100, illustrated in FIG. 5*d*, is a disengagement or neutralisation position configured so as not to activate a function corrector if the push-piece 130 is pressed. For example, in such a position, the control stem 120 cannot operate a function corrector of the horological movement.

Thus, according to an alternative embodiment, the stable positions of the correction member 100 in the middle 20 can be defined as follows:

a first position P1 of the correction member 100 positioning the control stem 120 such that it faces the first function corrector 10 with a view to its activation by pressing the push-piece 130, a second position P2 of the correction member 100 positioning the control stem 120 such that it faces the second function corrector 12 with a view to its activation by pressing the push-piece 130, and a third position P3 of the correction member 100, for example an intermediate position between the first position P1 and the second position P2, positioning the control stem 120 such that it faces the first function corrector 10 and the second function corrector 12 with a view to their simultaneous activation by pressing the push-piece 130.

The correction member 100 further comprises first sealing means 160 for producing a seal in particular between the cylindrical body 110 and the control stem 120. The sealing member is, for example, formed by one or two O-rings superimposed on one another.

The case 2 further comprises second sealing means (not shown) configured to procure the seal between the middle 20 and the correction member 100, thus procuring the seal between the interior of the case 2 and the exterior of the case 2, while allowing for the displacements of the function corrector 100. The second sealing means are, for example, formed by a flexible membrane having a portion integral with the middle 20 and a portion integral with the correction member 100, for example the cylindrical body 110.

The case 2 and the correction member 100 described hereinabove allow a plurality of functions of a horological movement to be controlled. The choice of the function of the horological movement 1 to be operated is made by displacing the correction member 100 from one stable activation position to another. To do this, the user slides the correction member 100 by exerting a translational force on the correction member 100, via the push-piece 130, according to the arrows referenced A1 and shown in FIGS. 5*a* and 5*b*.

The sliding of the correction member 100 can be rectilinear or curvilinear.

In the example embodiment shown, the correction member 100 can be displaced in a rectilinear manner in a direction perpendicular to the axis X-X as shown in FIGS. 2, 5*a* and 5*b*. In the example embodiment, the translational force to be exerted is substantially tangent to the outer face 23 of the middle 20, at the aperture 21.

According to an alternative embodiment, the correction member 100 could be displaced along an arc of a circle, the centre whereof is common to the centre of the case 2. In such a case, the shape of the aperture 21 is adapted to allow for such curvilinear sliding.

When the correction member 100 is in position, the user operates the correction member 100 by pressing on the push-piece 130 in a direction indicated by the arrow referenced A2 in FIGS. 5*a* and 5*b*, parallel to the axis X-X. The pressure exerted goes against the return element 140, displacing the push-piece 130 and the control stem 120 towards the interior of the case 2 until contact is made with the selected function corrector 10, 12. An additional press on the push-piece 130 allows the function corrector 10, 12 to be operated and the function of said horological movement 1 associated with the function corrector 10, 12 to be activated, selected, reset or corrected.

In the present application, the control stem 120 operates two lever-type function correctors of a mechanical horological movement. However, the control stem could be considered such that it interacts with a function corrector of the electrical contact type allowing at least one function derived from the current time of any mechanism to be displayed, corrected, selected, engaged or reset.

The invention further relates to a case 2 comprising a horological movement 1 comprising at least two function correctors 10, 12 for displaying, correcting, selecting, engaging or resetting functions derived from the current time, such as a date, a time zone, or a chronograph, etc., and at least one multifunction function corrector 100 according to the invention allowing a function corrector 10, 12 of the movement 1 to be selected and operated when the push-piece 130 is pressed.

The invention further relates to a timepiece, such as a wristwatch, comprising a case 2 enclosing a horological movement 1 comprising at least two function corrector members 10, 12 for displaying, correcting, selecting, engaging or resetting functions derived from the current time, such as a date, a time zone, or a chronograph, etc.

The invention claimed is:

1. A timepiece case (2) comprising a middle (20) delimiting an internal space capable of receiving a horological movement (1) having a function corrector (10, 12) for carrying out various functions of activating, selecting, resetting and/or correcting a piece of information derived from athe current time of said horological movement (1), the middle (20) having a through-aperture (21) configured to receive a correction member (100) capable of interacting with the function corrector (10, 12) of said horological movement (1), said correction member (100) comprising:

a cylindrical body (110) with a longitudinal axis (X-X), a control stem (120) capable of moving in translation within said cylindrical body, along the longitudinal axis (X-X), said control stem (120) comprising an end (122) intended to cooperate with the function corrector (10, 12) of said horological movement (1), a push-piece (130) integral with said control stem (120) and accessible to the user from outside said case (2), wherein the correction member (100) is mounted such to slide laterally, perpendicular to the longitudinal axis, within said aperture (21) in the middle (20) between a plurality of stable positions (P1, P2, P3, P4), each of the stable positions (P1, P2, P3, P4) modifying the lateral position of the end (122) of said control stem (120) facing said horological movement (1).

2. The timepiece case (2) according to claim 1, wherein for one of the stable positions (P1, P2, P3) of the correction member (100), the end (122) of said control stem (120) is capable of being positioned facing a the function corrector (10, 12) comprised in the horological movement (1), such that the correction member (100) is capable of carrying out a function associated with the function corrector (10, 12) when the push-piece (130) is pressed.

3. The timepiece case (2) according to claim 1, wherein for one of the stable positions (P3) of the correction member (100), the end (122) of said control stem (120) is capable of being positioned facing a plurality of function correctors (10, 12) comprised in the horological movement (1), such that the correction member (100) is capable of simultaneously carrying out a combination of functions associated with the function correctors (10, 12) when the push-piece (130) is pressed.

4. The timepiece case (2) according to claim 1, wherein for one of the stable positions (P4) of the correction member (100), the end (122) of said control stem (120) is configured such that it is inactive with respect to the horological movement (1) when the push-piece (130) is pressed.

5. The timepiece case (2) according to claim 1, wherein said horological movement (1) comprises a first function corrector (10) and a second function corrector (12), and wherein in a first stable position (P1) of the correction member (100), the end (122) of said control stem (120) is capable of being positioned such that it faces the first function corrector (10), and wherein in a second stable position (P2) of the correction member (100), said end (122) of said control stem (120) is capable of being positioned such that it faces the second function corrector (12).

6. The timepiece case (2) according to claim 1, wherein the aperture (21) is configured to allow the correction member (100) to be mounted within the middle (20) such that it slides in a rectilinear manner.

7. The timepiece case (2) according to claim 1, wherein the aperture (21) is configured to allow the correction member (100) to be mounted within the middle (20) such that it slides in a curvilinear manner.

8. The timepiece case (2) according to claim 1, wherein the cylindrical body (110) cooperates with a mounting ring (180) capable of moving in the aperture and configured to secure the correction member (100) to said middle (20).

9. The timepiece case (2) according to claim 8, wherein the aperture (21) forms a slide and in that the mounting ring (180) forms a slider capable of moving in the aperture (21).

10. The timepiece case (2) according to claim 9, wherein the aperture (21) is oblong in shape and in that the mounting ring (180) has a complementary shape so as to slide in said aperture (21).

11. The timepiece case (2) according to claim 8, wherein said mounting ring (180) comprises a flange (182) configured to cooperate with a spot face (26) provided at an inner face (24) comprised in the middle (20).

12. The timepiece case (2) according to claim 8, wherein said cylindrical body (110) is made integral with the mounting ring (180) by screwing or driving in.

13. The timepiece case (2) according to claim 1, wherein the cylindrical body (110) has the shape of a cylinder of revolution with an axis of revolution (X-X) and wherein the control stem (120) is coaxial with the cylindrical body (110).

14. The timepiece case (2) according to claim 1, wherein the correction member (100) comprises a return element (140) configured to ensure the return of the push-piece (130) to a stable rest position.

15. The timepiece case (2) according to claim 1, wherein the case (2) comprises an indexing member (150) for indexing the plurality of stable positions of the correction member (100).

16. The timepiece case (2) according to claim 15, wherein the indexing member (150) is formed by a plurality of ball indexers carried by the middle (20).

17. The timepiece case (2) according to claim 15, wherein the indexing member (150) is formed by a plurality of ball indexers provided in bores (28) comprised in the middle (20).

18. The timepiece case (2) according to claim 15, wherein the ball indexers cooperate with hollows (185) provided on the mounting ring (180).

19. A timepiece, comprising:

the case (2) according to claim 1;

the horological movement (1) housed inside said case (2), the horological movement (1) carrying and driving means for displaying the current time and comprising the function corrector (10, 12) allowing at least one piece of information derived from the current time of said horological movement (1) to be activated, selected, reset or corrected.

20. The timepiece according to claim 19, wherein said horological movement (1) comprises at least a first function corrector (10) and a second function corrector (12) formed by superimposed pivoting levers.

21. The timepiece according to claim 19, wherein said timepiece is a wristwatch.

* * * * *